Jan. 1, 1957 R. G. KNUTSON 2,776,398

SYNCHRONOUS DISCRIMINATOR-AMPLIFIER

Filed March 16, 1953 2 Sheets-Sheet 1

INVENTOR.
ROY G. KNUTSON
BY C. D. O'Brien
E. C. Walsh
ATTORNEYS

Jan. 1, 1957 R. G. KNUTSON 2,776,398

SYNCHRONOUS DISCRIMINATOR-AMPLIFIER

Filed March 16, 1953 2 Sheets-Sheet 2

INVENTOR.
ROY G. KNUTSON

BY G. D. O'Brien
E. C. Walsh
ATTORNEYS

United States Patent Office 2,776,398

Patented Jan. 1, 1957

2,776,398

SYNCHRONOUS DISCRIMINATOR-AMPLIFIER

Roy G. Knutson, Arcadia, Calif., assignor to the United States of America as represented by the Secretary of the Navy

Application March 16, 1953, Serial No. 342,765

3 Claims. (Cl. 321—27)

Figure 1:
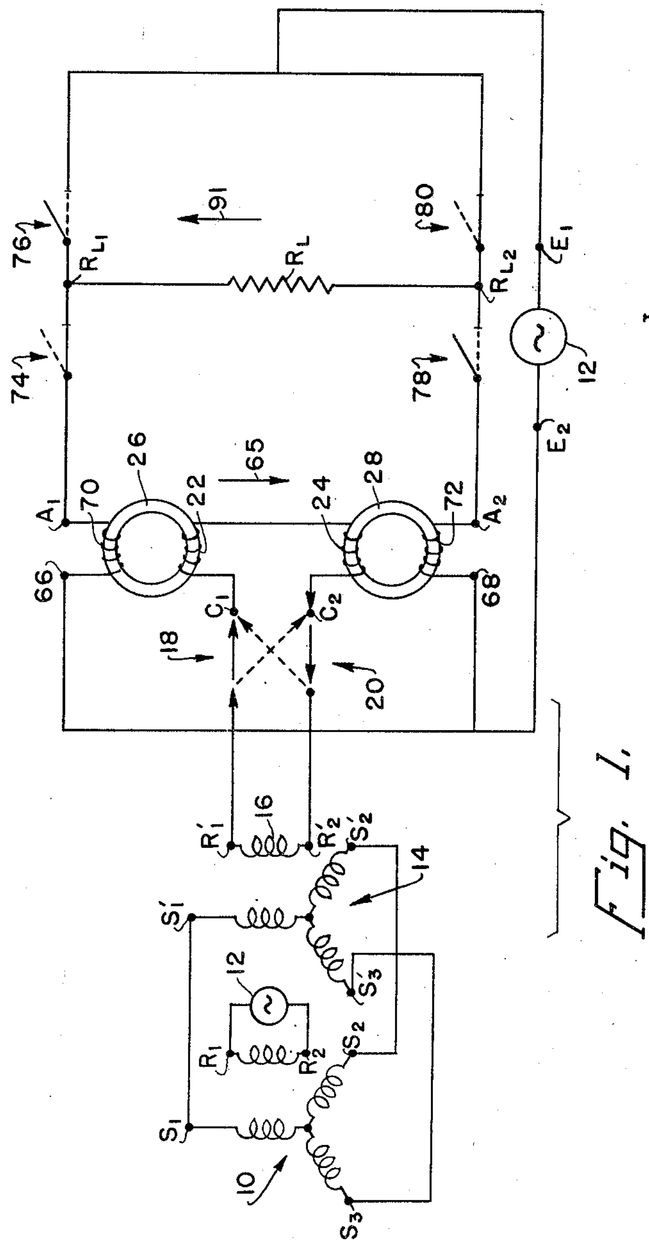

(Granted under Title 35, U. S. Code (1952), sec. 266)

The invention described herein may be manufactured and used by or for the Government of the United States of America for governmental purposes without the payment of any royalties thereon or therefor.

This invention relates to discriminators and magnetic amplifiers and in particular to improvements in such devices which permit an increased gain to be obtained while simultaneously improving the reliability, ruggedness and tolerance to high temperatures of such devices.

This invention is readily applicable to provide for the derivation and amplification of the error component of a suppressed carrier modulated A. C. signal, or error voltage, such as is derived from an A. C. synchro system, which signal is generally at a comparatively low power level. This invention can be used to isolate and amplify the error component of the low level error voltage so as to produce an output voltage at a much higher power level and capable of performing useful work.

In conventional servo-mechanism practice, for example, the phase and amplitude of the suppressed carrier signal, or error voltage, are ordinarily detected by phase discriminators using vacuum tubes or ring modulators consisting of transformers and static rectifiers, and the resultant phase-detected signal may be applied to amplifiers of the vacuum tube type, or to magnetic amplifiers employing static rectifiers.

The disadvantages of the conventional methods are the necessity for a number of different supply voltages, and the necessity for removal of the heat liberated particularly where the equipment is operated in a confined space. When vacuum tube discriminators and amplifiers are used, the general lack of reliability of vacuum tubes under shock and acceleration is well known and constitutes a further objection to their use in certain applications.

Ring modulators and magnetic amplifiers employing static rectifiers overcome some of the disadvantage found in circuits employing vacuum utbes, but they have the disadvantage of reducing the available amplification due to losses in the discriminator and the shunting effect of the finite back resistance of static rectifiers. Also, the deterioration in performance of static rectifiers at high temperatures limits their use where it is difficult or impossible to adequately cool them.

It is, therefore, an object of this invention to provide a discriminator-amplifier having a high gain and operable at high temperatures.

It is a further object of this invention to provide a discriminator-amplifier of compact and rugged design which is suitable for use in confined spaces and at high temperatures.

It is another object of this invention to provide a discriminator-amplifier in which commutating means replace discriminator and current rectifying means.

Figure 4:
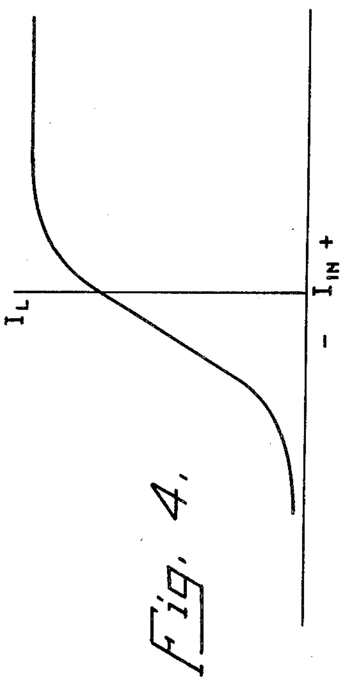
Figure 2:
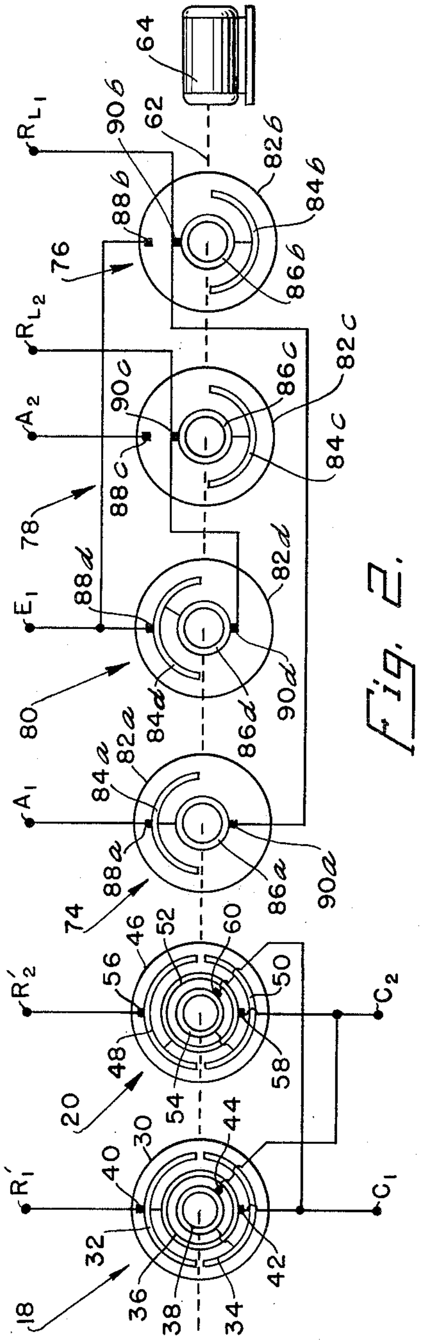
Figure 3:
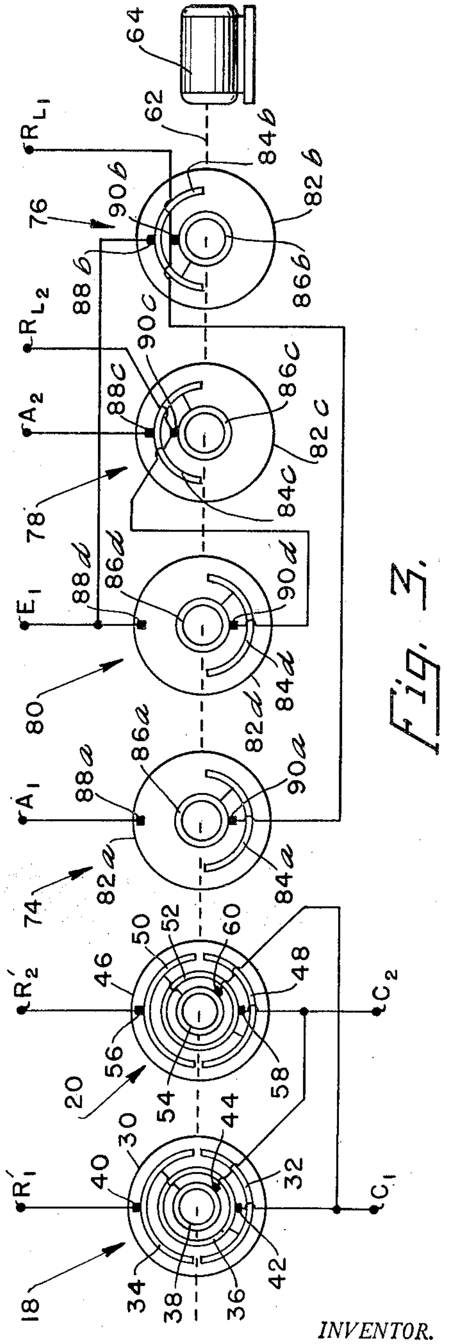

Still further objects and many of the attendant advantages of this invention will be readily appreciated as the same becomes better understood by reference to the following detailed description when considered in connection with the accompanying drawings wherein:

Fig. 1 schematically illustrates a preferred form of the subject of the invention;

Figs. 2 and 3 schematically illustrate the operation of a synchronous switching means used in Fig. 1; and Fig. 4 is a graph of the magnetic amplifier output current characteristics.

Referring to Fig. 1, a synchro generator 10 comprises three stator coils Y-connected, the terminals of the coils being $S_1$, $S_2$ and $S_3$, and a rotor having terminals $R_1$ and $R_2$. The rotor is energized by an A. C. reference voltage obtained from a suitable source, such as generator 12. The terminals $S_1$, $S_2$ and $S_3$ of the stator coils of generator 10 are connected to the terminals $S_1'$, $S_2'$ and $S_3'$ of synchro control transformer 14. Whenever the generator 10 is energized by source 12, there will be developed in rotor 16 of control transformer 14 an A. C. voltage, the phase polarity and peak value of which identify the angular difference, or error, between the position of rotor 16 and the position of the rotor of synchro generator 10. The voltage induced in coil 16 and appearing across terminals $R_1'$ and $R_2'$ of coil 16 will subsequently be referred to as the error voltage. Its frequency will be the same as the frequency of the voltage obtained from source 12 and it will be either in phase or 180° out of phase with respect to said voltage.

To convert the suppressed-carrier-modulated type of error voltage into a voltage whose magnitude and polarity are functions of the magnitude and direction of the error, the error voltage is applied to a discriminator, which comprises commutators 18 and 20 and associated circuitry. The output of the discriminator is then applied to series connected control windings 22 and 24 of magnetic cores 26 and 28 of a magnetic amplifier.

Referring now to Figs. 2 and 3, commutator 18 comprises a disc or wheel 30 on which is mounted conducting segments 32, 34, 36 and 38. Segments 32 and 36 are electrically interconnected as are segments 34 and 38. Brush 40 is adapted to engage either segment 32 or segment 34, brush 42 engages segment 36, and brush 44 engages segment 38.

Commutator 20 is constructed similarly and comprises disc or wheel 46 on which is mounted conducting segments 48, 50, 52 and 54. Segments 48 and 52 are electrically interconnected as are segments 50 and 54. Brush 56 is adapted to engage either segment 48 or segment 50; brush 58 engages segment 52; and brush 60 engages segment 54.

Brushes 40 and 56 are connected respectively to terminals $R_1'$ and $R_2'$ of coil 16. Output terminal $C_1$ is connected to brushes 42 and 60, while output terminal $C_2$ is connected to brushes 44 and 58. The control windings 22 and 24 are connected in series between the terminals $C_1$ and $C_2$.

Discs or wheels 30 and 46 are mounted on shaft 62, which is diagrammatically illustrated as a dashed line. Shaft 62 is rotated by synchronous motor 64 which may be powered by source 12 or by some other source, the frequency of whose output is the same as that obtained from source 12. For simplicity of explanation the arrangement of the commutator segments in Figs. 2 and 3 is such that a two pole synchronous motor must be used to drive shaft 62. It is, of course, within the scope of this invention to use other forms of synchronous motors having integral multiples of two poles, such as 4, 6, etc.

Fig. 2 shows the arrangement of the segments and branches at one portion of the cycle while Fig. 3 shows the arrangement a half cycle later, corresponding to a rotation of $\pi$ radians of shaft 62. If at that portion of the cycle depicted in Fig. 2, terminal $R_1'$ is positive and $R_2'$ is negative, it can be seen that terminal $C_1$ is connected to $R_1'$ and terminal $C_2$ is connected to $R_2'$ so that current will flow between terminals $C_1$ and $C_2$ in the direction shown by arrow 65 in Fig. 1.

A half cycle later $R_1'$ will be negative and $R_2'$ will be positive, and the commutator discs 30 and 46 will be in the position shown in Fig. 3. At this time terminal $R_1'$ will be connected to terminal $C_2$ while terminal $R_2'$ will be connected to $C_1'$, so that current will still flow in the same direction between terminals $C_1$ and $C_2$ through control windings 22 and 24. When the phase of voltage developed in coil 16 is 180° from that assumed above, the rectified current flowing through coils 22 and 24 will be flowing in a direction opposite to that shown by arrow 65. The magnitude of the current flowing through coils 22 and 24 is of course directly proportional to the magnitude of the voltage induced in coil 16. Therefore, commutators 18 and 20 together with their associated circuitry can be used as a discriminator.

The means for amplifying the current flowing through control windings 22 and 24 illustrated in Fig. 1 comprises a magnetic amplifier of the incomplete bridge type having a single ended D. C. output. Terminals 66 and 68 of load windings 70 and 72 which are wound on magnetic cores 26 and 28 are connected to the output terminal $E_2$ of a source of A. C. potential of the same frequency as source 12. The rectifying network of the magnetic amplifier includes commutators 74 and 76 which serve as rectifying elements and which are connected in series between terminal $A_1$ of winding 70 and terminal $E_1$ of source 12; and commutators 78 and 80 which also serve as rectifying elements and which are connected in series between terminal $A_2$ of winding 72 and terminal $E_1$ of source 12. Terminal $R_{L_1}$ of load impedance $R_L$ is connected between commutators 74 and 76, and terminal $R_{L_2}$ is connected between commutators 78 and 80.

Commutator 74 comprises a disc or wheel **82*a* on which is mounted conducting segments 84*a* and 86*a* which in turn are electrically interconnected. Brush 88*a* engages segment 84*a* during one half of a revolution of disc 82*a*, and brush 90*a* engages segment 86*a*. Commutators 76, 78 and 80 similarly comprise discs or wheels 82*b*, 82*c* and 82*d*, on which are mounted conducting segments 84*b*, 84*c* and 84*d*, and segments 86*b*, 86*c*, and 86*d*, the segments on each disc being electrically interconnected. Brushes 88*b*, 88*c* and 88*d*, respectively, engage conducting segments 84*b*, 84*c* and 84*d* during one half of a revolution of discs 82*b*, 82*c* and 82*d*. Brushes 90*b*, 90*c* and 90*d*, respectively, engage segments 86*b*, 86*c* and 86*d*. It should be noted that the condition of segments and brushes in commutators 76 and 78 differs from that shown for commutators 74 and 80. Discs or wheels 82*a*, 82*b*, 82*c* and 82*d* are mounted on shaft 62 which is driven by motor 64**.

At the time the brushes and conducting segments of commutators 74, 76, 78 and 80 are in the position shown in Fig. 2, an electrical circuit will be completed from terminal $E_1$ to $R_{L_2}$, from $R_{L_2}$ through $R_L$ to $R_{L_1}$, from $R_{L_1}$ to $A_1$, and from $A_1$ through coil 70 to terminal $E_2$ of source 12. The circuit from $E_1$ to $R_{L_1}$ is open as is the circuit from $R_{L_2}$ to $A_2$. If the overall arrangement is such that $E_1$ is positive with respect to $E_2$ at this time, then current will flow through load $R_L$ in the direction indicated by arrow 91.

A half cycle later when the brushes and conducting segments of commutators 74, 76, 78 and 80 are in the position shown in Fig. 3, an electrical circuit will be completed from $E_1$ to $R_{L_1}$, from $R_{L_1}$ through load $R_L$ to $R_{L_2}$, from $R_{L_2}$ to $A_2$, and from $A_2$ through coil 72 to $E_2$. Since at this time the potential at $E_1$ is negative with respect to $E_2$ the current flow through $R_L$ will be in the same direction as indicated by arrow 91. The particular direction of flow of current through $R_L$ in a given embodiment depends upon the concurrent phase condition of the voltage obtained from source 12 and the position of the brushes and segments of the commutators.

In the circuit illustrated, the current through $R_L$ is unidirectional. The quantity of current $I_L$ flowing through $R_L$ varies with the direction and magnitude of the current $I_{in}$ in the control windings 22 and 24, as shown in Fig. 4. The position of the curve relative to zero input current can be changed by the use of bias windings on cores 26 and 28, if desired, in accordance with conventional practice.

While the commutator brush loads can be made quite light, it may be desirable to use a salient pole motor to provide enough stiffness so that external loads would not cause motor 64 to lag in phase behind the voltage applied by source 12. If adjustment is necessary it can be easily provided by rotating discs 30, 46, **82*a*, 82*b*, 82*c* and 82*d* an appropriate amount on shaft 62**.

Obviously many modifications and variations of the present invention are possible in the light of the above teachings. It is, therefore, to be understood that within the scope of the appended claims the invention may be practiced otherwise than as specifically described.

What is claimed is:

1. An electro-mechanical discriminator-amplifier system for derivation of an amplified output voltage corresponding to the modulation component of a suppressed-carrier-modulated type of error signal, said error signal being obtained from pick-off means energized by a source of carrier-frequency voltage, said discriminator-amplifier system comprising, in combination: reversing switch means adapted to receive said error signal as an input signal thereto; means for operating said reversing switch means in synchronism with alternations of said carrier-frequency voltage to produce phase-rectifying action upon said input signal and to correspondingly provide an output amplifier-actuating signal; magnetic amplifier means having control windings in circuit with said reversing switch means for control of said magnetic amplifier by said actuating signal; said magnetic amplifier having an output circuit including load windings and a load circuit energized by said source of carrier-frequency voltage through commutating switch means serving as mechanical rectifiers; and means for operating said commutating switch means in synchronism with alternations of said carrier-frequency voltage to correspondingly provide said amplified output voltage across said load circuit.

2. A discriminator-amplifier system as defined in claim 1, wherein said reversing switch means and said commutating switch means are operated by a single synchronous motor powered by said source of carrier-frequency voltage.

3. A discriminator-amplifier system as defined in claim 2, wherein said magnetic amplifier is of single-ended self-saturating type and wherein said amplified output voltage is of unidirectional polarity.

References Cited in the file of this patent

UNITED STATES PATENTS

| | | |
|---|---|---|
| 1,935,568 | Koegh | Nov. 14, 1933 |
| 2,279,729 | Bedford | Apr. 14, 1942 |
| 2,460,006 | Hansen | Jan. 25, 1949 |
| 2,596,698 | Laing | May 13, 1952 |
| 2,697,198 | Schmidt | Dec. 14, 1954 |

OTHER REFERENCES

"Magnetic Amplifiers of the Balance Detector Type," by Geyger, AIEE Miscellaneous Paper 50-93, December 1949.